Figure 1:
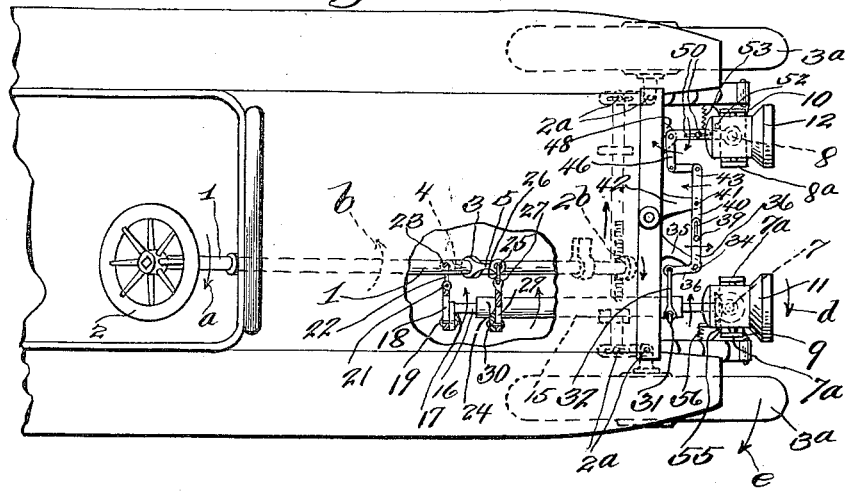

T. H. PASCHKE.
DIRIGIBLE AUTOMOBILE LAMP.
APPLICATION FILED NOV. 30, 1914.

1,138,404.

Patented May 4, 1915.

Witnesses
Philip Terrell.
Francis T. Boswell.

Inventor
Theodore H. Paschke,
By D. Swift & Co.,
his Attorneys

UNITED STATES PATENT OFFICE.

THEODORE H. PASCHKE, OF HAMPTON, NEBRASKA.

DIRIGIBLE AUTOMOBILE-LAMP.

1,138,404.     Specification of Letters Patent.     Patented May 4, 1915.

Application filed November 30, 1914. Serial No. 874,846.

*To all whom it may concern:*

Be it known that I, THEODORE H. PASCHKE, a citizen of the United States, residing at Hampton, in the county of Hamilton and State of Nebraska, have invented a new and useful Dirigible Automobile-Lamp; and I do hereby declare the following to be a full, clear, and exact description of the invention, such as will enable others skilled in the art to which it appertains to make and use the same.

This invention relates to a new and useful dirigible automobile lamp, and an object of the invention is to provide a device of this nature, whereby, when the right hand wheel is turned to the right, the corresponding right hand lamp will likewise turn to the right, the left hand light remaining stationary and throwing its rays straight ahead, and when the left hand wheel is turned to the left the corresponding left hand lamp will turn in the same direction, the right hand lamp remaining stationary, and its light rays thrown straight ahead, and vice versa.

In practical fields the details of construction may necessitate alterations, falling within the scope of what is claimed.

The invention comprises further features and combination of parts, as hereinafter set forth, shown in the drawings and claimed.

Figure 2:
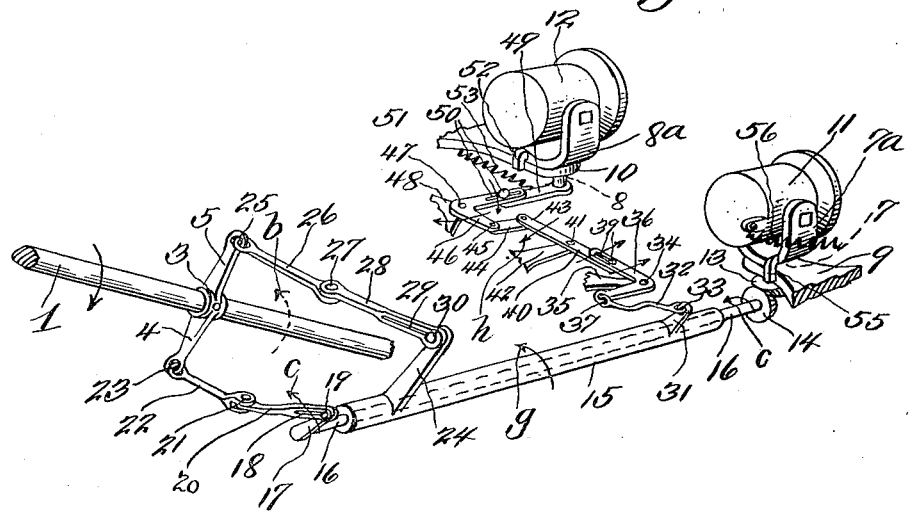

In the drawings: Figure 1 is a view of the improved dirigible lamp construction as applied to an automobile. Fig. 2 is an enlarged detail view showing the lamps and the operating means therefor removed from the automobile.

Referring more especially to the drawings, 1 designates the usual steering post of the automobile, which is provided with the usual wheel 2. A casting 3 is mounted upon the post to move therewith and is provided with arms 4 and 5. The steering post is constructed or provided with the usual or conventional form of connections 2$^a$ and 2$^b$ to the steering wheels 3$^a$ of the automobile, so that upon returning the wheel 2 in the direction of the arrow *a* the front wheel 3$^a$ will turn to the right, and when the wheel 2 is rotated in the opposite direction as indicated by the arrow *b*, said front wheels 3$^a$ will turn to the left.

The head lights of the automobile are fulcrumed in the usual manner as shown at 7 and 8 upon the brackets 9 and 10, said lamps being designated by the numerals 11 and 12. The fulcrumed pin 7 of the lamp holder 7$^a$ of the lamp 11 has a beveled gear 13, with which the gear 14 meshes. Designed to be mounted in suitable bearings (not shown) of the automobile is a hollow shaft 15, through which the rod 16 telescopically extends, the gear 14 being carried by said rod 16. The rear end of the rod 16 has an arm 17, which in turn is provided with a slot and pin connection 18 19 with the link 20, which in turn is pivoted at 21 to the link 22. The link 22 is connected at 23 to the arm 4 of the casting 3. The hollow shaft 15 is provided with an arm 24. Connected at 25 to the arm 5 is a link 26, which in turn is pivoted at 27 to the link 28, which is provided with a slot and pin connection 29 and 30 with the arm 24. The hollow shaft 15 is provided with a second arm 31, to which a link 32 is connected at 33. Pivoted at 34 to a projection 35 of the frame of the automobile is a bell crank lever 36, one arm of which is pivoted at 37 to the link 32, the other arm has a slot and pin connection 39 with one end of the oscillatory lever 40, which is pivoted at 41 to a projection 42 of the frame of the automobile. The end 43 of the lever 40 has a link 44, which in turn is pivoted at 45 to one arm of the bell crank lever 46, fulcrumed at 47 to a suitable projection 48 of the frame of the automobile. The fulcrum pin 8 of the holder 8$^a$ of the lamp 12 has an arm 49, which is provided with a slot and pin connection 50 to the arm 51 of the bell crank lever 46. The holder 8$^a$ of the lamp 12 has a lug 52 to limit the lamp 12 in one direction, in other words, prevent the lamp from ever turning to the right, there being a spring 53 connected to the arm 49 and to the bracket 10, to hold the lug 52 in contact with said bracket 10. Said spring 53 acts to return the lamp 12 to its normal position with the lug 52 in contact with the bracket 10, subsequently to having thrown the lamp 12 to the left. A lug 55 is carried by the holder 7$^a$ to contact with the bracket 9 to prevent the lamp 11 from ever turning to the left, there being a spring 56 connected to the lamp 11 and to one of the springs of the automobile, to hold the lug 55 in contact with the bracket 9. This spring 56 acts to return the lamp to its normal position subsequently to having been thrown to the right.

Operation: When turning the steering wheel 2 in the direction of the arrow *a* the arm 4 pulls upon the link connections 20 and 22, thereby rocking the rod 16 in the direction of the arrow c, and through the medium of the intermeshing gears 13 and 14 the lamp 11 is thrown to the right in the direction of the arrow d, the same direction as the front wheels 3ª, which direction is indicated by the arrow e. When turning or throwing the lamp 11 in this direction against the action of the spring 56, the lamp 12 remains stationary, owing to the link 28 sliding with relation to the pin 30 which extends through the slot 29 of the link 30. However, in reversing the wheel 2 in the direction of the arrow b, the links 26 and 28 pull upon the arm 24, while the link 20 slides with relation to the pin 19, owing to the provision of the slot 18 in the link 20. When the arm 24 is pulled upon the hollow shaft 15 is rocked in the direction of the arrow g, the arm 31 pushing the link 32, which will rock the bell crank lever 36, which in turn rocks the lever 40 on its pivot 41, in the direction of the arrow h, therefore through the medium of the link 44 the bell crank lever 46 is oscillated upon its pivot 47, which in turn will rock the arm 49 of the fulcrum 8, thereby throwing the lamp 12 to the left, to correspond with the turning of the front wheels 3ª, which are likewise thrown to the left. However, the lamp 11 remains stationary, owing to the link 20 sliding with relation to the pin 19. When the lamp 11 is thrown to the right, or when the lamp 12 is thrown to the left, either one or the other is returned to its normal position by its spring means.

The invention having been set forth what is claimed as new and useful is:—

1. In combination with a steering mechanism including a steering post having lateral projections, a pair of automobile lamps, a pair of telescoping rocking shafts, each having a sliding connection with one of the projections, and connections between said shafts and said automobile lamps.

2. In combination with a steering mechanism of an automobile having a steering post provided with lateral projections, a pair of automobile lamps, a pair of telescoping rocking shafts, each being provided with a lateral arm, links connecting said projections and said arms, said links being provided with slots where they are pivoted to the arm, connections between said shafts and the lamps of the automobile, and means for returning the lamps to their normal positions.

In testimony whereof I have signed my name to this specification in the presence of two subscribing witnesses.

THEODORE H. PASCHKE.

Witnesses:
B. E. Paschke,
W. C. Paschke.

Copies of this patent may be obtained for five cents each, by addressing the "Commissioner of Patents, Washington, D. C."